United States Patent [19]

Chau et al.

[11] Patent Number: 4,874,568

[45] Date of Patent: Oct. 17, 1989

[54] PROCESS OF MAKING A POROUS MEMBRANE

[75] Inventors: C. C. Chau; Jang-hi Im, both of Midland, Mich.

[73] Assignee: The Dow Chemical Company, Midland, Mich.

[21] Appl. No.: 249,035

[22] Filed: Sep. 26, 1988

[51] Int. Cl.$^4$ .......................... B29C 43/30; B29C 67/04; B29C 67/20; B32B 31/24

[52] U.S. Cl. ........................................ 264/49; 264/126; 264/141; 264/171; 264/211.12; 264/320; 264/331.13; 264/331.17; 264/344

[58] Field of Search ................... 264/41, 49, 126, 141, 264/171, 211.12, 232, 320, 325, 331.13, 331.17, 340, 344

[56] References Cited

U.S. PATENT DOCUMENTS

| | | | |
|---|---|---|---|
| 3,549,734 | 12/1970 | Yasuda et al. | 264/171 X |
| 3,565,985 | 2/1971 | Schrenk et al. | 264/171 |
| 3,567,815 | 3/1971 | Frank | 264/176.1 |
| 3,808,305 | 4/1974 | Gregor | 264/41 X |
| 3,839,516 | 10/1974 | Williams et al. | 264/41 |
| 3,862,030 | 1/1975 | Goldberg | 264/41 X |
| 3,884,606 | 5/1975 | Schrenk | 264/171 X |
| 3,969,452 | 7/1976 | Ciliberti et al. | 264/41 |
| 4,164,437 | 8/1979 | Henne et al. | 264/41 X |
| 4,340,479 | 7/1982 | Pall | 264/41 X |

Primary Examiner—Jeffery Thurlow
Assistant Examiner—Leo B. Tentoni

[57] ABSTRACT

A method for preparing porous membranes containing a homogeneous microporous structure and narrow pore size distribution which are useful for ultrafiltration, distillation and substrates for composite membranes, including preparing films, pellets or sheets containing alternating microlayers of high density polyethylene and polystyrene, recoextruding these films, pellets or sheets, pulverizing into fine granules or powder, compression molding or sintering into thin films, immersing these films in a solvent bath into which one component is selectively dissolved and separating the resultant porous membrane from the solvent.

21 Claims, 1 Drawing Sheet

PROCESS OF MAKING A POROUS MEMBRANE

CROSS REFERENCE TO RELATED APPLICATION

The present application claims a species of the generic invention disclosed herein but disclosed and claimed along with another species in my copending application Ser. No. 07,249,034, filed on Sept. 26, 1988 and entitled POROUS MEMBRANES AND THEIR PREPARATION.

BACKGROUND OF THE INVENTION

The present invention relates to a novel process for preparing porous membranes containing homogeneous microporous structure and narrow pore size distribution. The membranes are useful for ultrafiltration, distillation and substrates for composite membranes.

Porous membranes are conventionally prepared by solvent casting or mechanical stretching of polymeric materials. For example, film having a microporous structure can be prepared by drawing or stretching at ambient conditions a crystalline, elastic starting film in an amount of about 10 to 300% of its original length with subsequent stabilization by heat setting of the drawn film under a tension such that the film is not free to shrink or can shrink only to a limited period. Although the pore size can be varied by manipulating the processing parameters, such as stress, stretching rate and temperature, the size distribution is usually broad and sensitive to any fluctuation of the conditions.

Another type of popular commercial porous membrane is prepared by solvent casting a solution containing a water-soluble additive which is leached from the cast membrane, thus creating the required porosity. The film casting conditions are manipulated to create a very thin active surface embedded on a microporous spongy mass. Such membranes also have the same problem of having a broad distribution of pore size.

Porous films have been made by casting a solvent solution of a resin or cellulose derivative on a temporary support or substrate as a thin film, after which the solvent is removed or exchanged under carefully controlled conditions. Solvent removal and exchange are very slow and adjustment of processing conditions for close control of product characteristics is difficult. Another process for the preparation of porous membranes also starts from a solution of resin or cellulose derivative and includes casting a film of the solution on a support, after which the membrane is formed by precipitation by immersion of the film in a nonsolvent for the resin or cellulose derivative. In still another method, a polymeric film is extruded under conditions of low melt temperature and high melt stress, the extruded film is annealed while in a relaxed or untensioned state, the film is then uniaxially stretched to develop the desired void structure and the resulting porous film is heat treated in a tension state to stabilize the void structure. Tight control of processing conditions is necessary, since pore size and pore size distribution are highly sensitive to fluctuation in processing conditions.

Although the rated pore size for prior art films may be quite small, many of the pores may actually be substantially larger. While it is desirable for microporous films to exhibit sharp size cutoff, i.e., to sharply delineate the size molecule or particle which will pass from the size which will not, prior art films often do not exhibit this property. If they do, they are very expensive to produce.

SUMMARY OF THE INVENTION

It has now been discovered that microporous membranes having a narrow pore size distribution and sharp size cutoff are provided by a process comprising forming a melt of a lamellar or laminate product composition formed from a plurality of alternating layers, each layer comprising at least two different polymeric materials, at least one of said different polymeric materials having a preferential solubility in a selective solvent with respect to at least one other of said different polymeric materials, wherein each said layer has been divided and reoriented to form discrete domains of random orientation in said melt; forming said melt into a thin solid unitary membrane structure; contacting said solid unitary structure with an extraction medium which has a preferential solubility for one of said two different polymeric materials to remove said preferentially soluble polymeric material from said solid unitary structure to form a porous unitary structure; and separating said extraction medium from said porous unitary structure.

We have developed different techniques for forming said lamellar composition. One involves comminuting a laminate of a plurality of alternating layers, each of which may include both said polymeric materials or each of which may include only one of said polymeric materials, remelting and recoextruding said comminuted material to form a second laminate of a plurality of layers, recomminuting the second laminate and forming the melt from said recomminuted laminate.

These and other objects, advantages and features of the present invention will be more fully understood and appreciated by reference to the written specification and appended drawings.

DESCRIPTION OF THE PREFERRED EMBODIMENT

Figure 1:
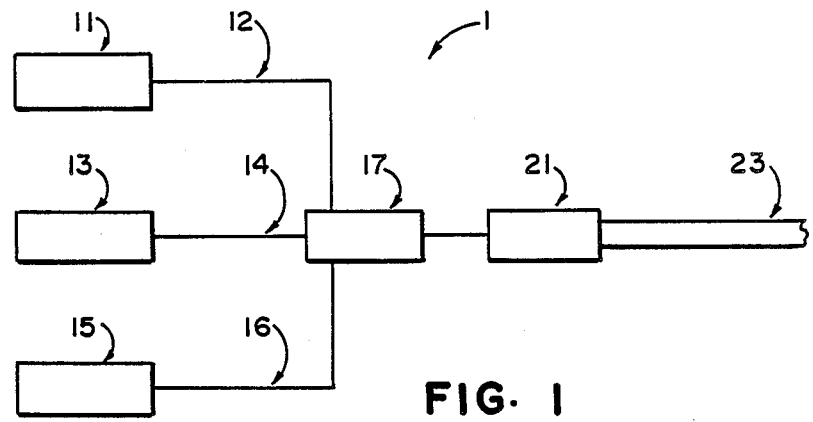
FIG. 1 is a schematic representation of the method and apparatus employed in accordance with the invention.

In one preferred embodiment, the lamellar or laminate product composition comprising a plurality of alternating layers is formed from another melt of a lamellar composition comprising a plurality of thin layers of a first polymeric material interdigitated with thin layers of a second polymeric material, said first and second polymeric materials being different from each other and at least one of said first and second polymeric materials having a preferential solubility in a selected solvent with respect to the other of said first and second polymeric materials. Optionally, the layers of lamellar compositions can have interdigitated between each layer a thin layer of polymeric material which is effective to enhance the adhesion between layers. In a variation of this embodiment, each of said layers comprises a mixture of said different polymeric materials, rather than each layer comprising only one of said different polymeric materials.

In either variation, this first laminate is comminuted, remelted and recoextruded to form a second colaminate of a plurality of discrete layers. This second colaminate is then comminuted and the resulting particles are melted to form a thin structure. The resulting thin structure is contacted with an extraction medium which has a preferential solubility for at least one of said different polymeric materials to remove said preferentially soluble polymeric material from said second extrudate to form a porous extrudate and separating said extraction medium from said thin structure.

Yet another variation is broadly operable, especially where each layer of the first laminate comprises a mixture of said first and second polymeric materials. In this variation, said first laminate is comminuted and the resulting comminuted material remelted, recoextruded and directly formed into said thin membrane structure without recomminuting. This membrane structure is then contacted with said preferential solvent as above.

In forming microporous membranes in accordance with this invention, there must be employed at least two different film-forming thermoplastic polymeric materials which, with respect to each other, exhibit a differential solubility in a common solvent, be it an aqueous or nonaqueous solvent. Particularly preferred are combinations of water-soluble polymers with water-insoluble polymers and crystalline polymers with noncrystalline or amorphous polymers. It should be noted that combinations of the same kinds of polymers, for example, mixtures of two or more different water-soluble, two or more different water-insoluble, two or more different crystalline or two or more different amorphous polymeric materials can be used, providing that the requirement that a differential solubility between at least two of such materials is met. The soluble polymeric material generally will comprise from 10 to 90 volume percent, preferably 30 to 85 volume percent and most preferably 50 to 80 volume percent, of the total soluble and insoluble polymeric composition.

Compatibilizing components are components which are employed in an amount sufficient to improve the compatibility between the diverse polymeric materials. The amount of compatibilizing component typically ranges from 0 to 50, preferably 5 to 20, weight percent, based on the total weight of the membrane composition prior to treatment with the extraction medium. The type of compatibilizing component can vary depending upon factors such as the compositions of the necessary polymeric compositions which are employed. For example, when polymeric components such as polystyrene and polyethylene are employed, a thermoplastic elastomer such as a styrene-butadiene-styrene block copolymer can be employed as a compatibilizing component. In instances when each layer comprises a mixture of two or more different polymeric materials, the compatibilizing layer is preferentially one of the polymers used in the blend.

Given the criterion of differential solubility, substantially any film forming thermoplastic polymeric material can be employed in the practice of the invention. Suitable thermoplastic polymeric materials include the acrylonitrile-butadiene-styrene resins, acetal homopolymers and copolymers, acrylics, cellulosics, fluorocarbons, ionomers, low permeability thermoplastics, polyamides, polyaryl ethers, polyaryl sulfones, polycarbonates, thermoplastic polyesters, polyether sulfones, polyolefins, e.g., polyethylene, polypropylene, polybutylene and polyalimers, polyimides and polyamide-imides, polymethylpentene, polyphenylene oxide, polyphenylene sulfides, polystyrenes and other polyvinylidene aromatic resins, polysulfones and vinyl polymers including polyvinyl acetals, polyvinyl acetate, polyvinyl alcohol, polyvinyl carbazole, polyvinyl chloride, polyvinyl chloride-acetate and polyvinylidene chloride. Representative combinations include polyethylene-polystyrene, polypropylene-polystyrene, polypropylene-polyisobutylene, polysulfone-polyvinyl alcohol and polycarbonate-methylcellulose. Compatibilizing and/or adhesion enhancing layers include rubbery material such as a styrene-butadiene-styrene triblock copolymer and, when each layer comprises a mixture of two or more different polymeric materials, the compatibilizing layer is preferably one of the polymers used in the blend.

The laminates of adjacent discrete layers of polymeric material which are required above are formed by coextrusion. Coextrusion or simultaneous extrusion of two or more synthetic resinous materials is well known in the art and has been used for preparing sheet or film containing many layers, for example, 50, 100 or several hundred layers. A method and apparatus for such extrusion is disclosed in U.S. Pat. Nos. 3,565,985 and 3,884,606, herewith incorporated by reference. The coextrusion can be broadly described as a method for preparing a composite stream of interdigitated diverse synthetic resinous materials comprising providing at least a first stream of a heat-plastified synthetic resinous material and a second stream of heat plastified thermoplastic material, dividing each of the streams into a plurality of first substreams and a plurality of second substreams, respectively; combining the substreams to form a composite stream having the first substreams and the second substreams interdigitated, and forming the stream into a desired configuration having at least one major surface wherein the layers of the composite stream lie generally parallel to a major surface of the desired configuration.

It has been discovered that this coextrusion technique can be adapted to prepare membranes of channelized porous structure with controlled pore size, distribution and porosity. The adaptation of coextrusion technology provides a means of making extremely fine, regular and alternating domains from two or more polymer components. By making films or sheets out of the finely pelletized or pulverized microlayered blends without disturbing the morphology and leaching out at least one of the components by using conventional solvent leaching processes, porous membranes with extremely narrow distributions can be obtained. The pore size is now determined by the thickness of layers or the number of passes through the coextrusion process rather than the extent of mixing, compounding or stretching. The process is much more stable and less complicated than currently employed conventional processes. In addition, the porosity, pore morphology and mechanical strength can be controlled by adjusting the number of layers, relative layer thickness, layer arrangement and the materials chosen.

The thickness of the individual layers in the starting composite of adjacent layers is an important factor in determining the ultimate pore size of a porous membrane made in accordance with the present invention. Each of the thin layers should have a thickness in the range of from 0.03 to 5 microns, and preferably 0.03 to 1 micron, and most preferably 0.03 to 0.5 micron. Except to the extent that it determines the thickness of the individual layers, the number of layers in the coextruded laminate is not critical. In most coextrusion systems, fewer layers means that each layer is thicker. We have coextruded from 50 to 400 layers and processed them in accordance with the present invention. Pore size tends to decrease with thinner layers, but as the layers become ever thinner, the correlation between pore size and layer thickness is not a direct one.

The initial laminate is comminuted using conventional techniques. Pulverization of the laminate using conventional apparatus is typical.

It has been found that pore size and distribution can be advantageously affected by employing more than one recycle through the coextrusion apparatus. Currently, experience indicates that three passes of the blended compositions through the coextrusion apparatus appears to be optimum.

The laminate resulting from the final pass is pulverized and the granules are reformed into a thin film having a substantially uniform thickness by compression molding, sintering, compaction or any other known method under conditions such that the chosen method of preparing the film does not disturb to any significant degree the morphology of the intermediate melt state which exists during this film forming period. The film is leached by immersion, solvent washing, solvent jet spraying or any other known technique to selectively dissolve at least one of the polymeric materials from the film while leaving at least one polymeric component substantially untouched, to form a membrane having a microporous structure. The membranes prepared in accordance with this invention are characterized by a homogeneous microporous structure with a small pore size, narrow pore size distribution and a sharp size or molecular weight cutoff.

FIG. 1 schematically depicts apparatus and method which can be employed in the present invention. The apparatus, generally designated by the reference numeral 1, comprises in operative combination first, second and third sources of heat-plastified thermoplastic resinous material designated as 11, 13 and 15, respectively, which are extruders. A stream combining means 17 is in operative communication with sources 11, 13 and 15 through suitable conduits 12, 14 and 16, respectively. The discharge side of stream combining means 17 is in operative communication with a stream shaping means 21. The discharge side of stream combining means 17 comprises a stream multiplying means which is adapted to mechanically manipulate a composite layered stream to provide an increased number of layers.

Shaping means 21 has an appropriately shaped orifice to reform the stream from combining means 17 or the stream multiplying means into an appropriate product 23, such as pellets, sheet or film. After cooling, product 23 can be stored, pulverized and formed into a unitary structure and subsequently contacted with extraction medium to form the porous membranes of the invention or pulverized and recycled through apparatus 1.

Figure 2:
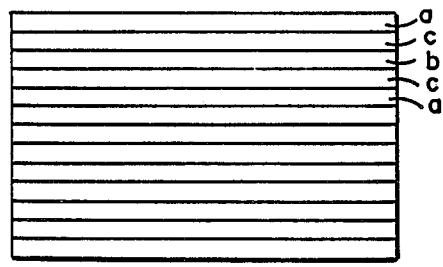
FIG. 2 schematically depicts a lamellar composition obtained as a product from the apparatus of FIG. 1.
Figure 2A:
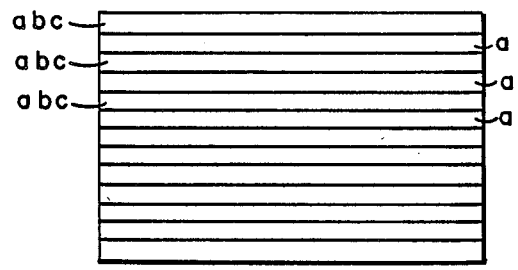

FIGS. 2 and 2a schematically depict the product 23 which is produced in apparatus 1. When the feedstock plastified in sources 11, 13 and 15 comprises melts of individual diverse polymers, such as melts of polyethylene (a), polystyrene (b) and styrene-butadiene-styrene block copolymer (c), respectively, product 23 is a laminate comprising a plurality of thin alternating layers of polyethylene (a)/styrene-butadiene-styrene copolymer (c)/polystyrene (b)/styrene-butadiene-styrene copolymer (c) . . . , as shown in FIG. 2. When the feedstock includes a blend of diverse polymeric materials, such as a mechanical blend of polystyrene and polyethylene or a previously coextruded and comminuted composition comprising a plurality of alternating layers of the individual polymers, product 23 will comprise a lamellar composition in which each layer will comprise a blend of the different polymers, which can optionally be interdigitated with layers of a different composition, such as one or the other of the different polymers, as shown in FIG. 2a.

Figure 3:
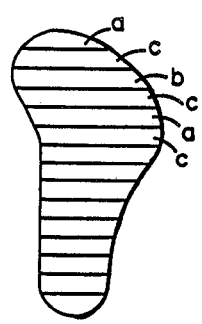
FIGS. 3 and 3a are schematic views of the lamellar composition feedstock employed in accordance with the invention.
Figure 3A:
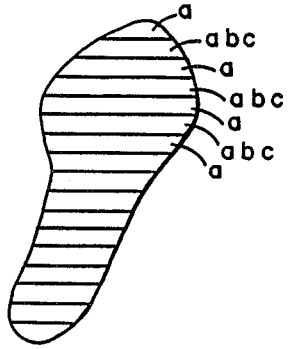

FIGS. 3 and 3a schematically depict alternate feedstock to sources 11, 13 and 15 of apparatus 1. This alternate feedstock typically results from pulverizing a layered composition, such as a product 23, to obtain small layered particles comprising a plurality of thin interdigitated alternating layers of different polymeric materials, FIG. 3, or thin interdigitated alternating layers of a blend, mechanical or otherwise, of diverse polymeric materials, FIG. 3a. The thickness of the final membrane material which is to be leached comprises typical thicknesses for such materials. Such thicknesses typically vary from about 0.5 to about 10.0 mils. Although it is contemplated that this invention will be used primarily to form microporous membranes, it is conceivable that other forms would also be desired, as for example, microporous granules, fibers, etc.

As the leaching medium, substantially any solvent material which will selectively leach out at least one of the thermoplastic polymeric components while leaving at least one of the thermoplastic polymeric components substantially untouched can be employed. For example, chloroform or toluene can be employed to leach polystyrene from polyethylene or polypropylene. Hexane or toluene are effective to leach polyisobutylene from polypropylene. Water can be employed to leach polyvinyl alcohol from polysulfone or methylcellulose from polycarbonate. The selection of the leaching medium is readily ascertainable by the person of ordinary skill in the polymer arts.

EXAMPLE 1

Porous Membranes Prepared From Double Passed Microlayer Pellets By Compression Molding Employing a microlayer coextrusion apparatus such as disclosed in U.S. Pat. No. 3,884,606, 100 parts by weight polyethylene, 100 parts by weight polystyrene and 20 parts by weight styrene-butadiene-styrene triblock copolymer elastomer were coextruded to obtain a lamellar composition comprising alternating layers of polyethylene, elastomer, polystyrene, elastomer, polyethylene, elastomer, etc. The lamellar composition comprised approximately 400 layers with each layer having a thickness of approximately 4 microns. After cooling, the lamellar composition was pelletized.

The pellets were reextruded with an additional stream of polyethylene to form a second lamellar composition containing 400 blended layers each comprising a polyethylene-polystyrene-elastomer blend with the additional polyethylene being interdigitated between each blend layer. The overall ratio of materials for the second lamellar composition as calculated was 55% polyethylene—45% polystyrene—7% triblock copolymer elastomer. The coextruded blend lamellar composition was pelletized into small cylindrical pellets of about 1.5 millimeters diameter by 4 millimeters long. Two grams of the pellets were spread uniformly between 2 pieces of polytetrafluoroethylene-coated polyester film (Mylar film, a trademark of E.I. Du Pont De Nemours & Company). The films with the pellets were put between 2 pieces of metal plates. The entire assembly was then compression molded in a Pasadena hydraulic press. The molding conditions were 2 minutes preheating at 300° F. (148.9° C.) under 500 pounds load, 4 minutes molding at 300° F. under 11,000 pounds load and 10 minutes cooling under 11,000 pounds load by circulating cool water around the press.

After stripping off the polyester film, the remaining molded film was about 2 to 4 mils thick and was translucent-like. Sample films cut from the molded film were immersed in a chloroform-filled bottle. The solvent bottle was then loaded in an Eberbach mechanical shaker for 16 hours to leach out the polystyrene. Samples were dried in a vacuum oven for 3 hours afterward. The dried films were seen to be light and opaque with fine pores distributed uniformly on both sides of the film as observed under SEM. The pore size distribution was measured by using a micromeritics Model 9305 mercury intrusion porosimeter. The membrane had a narrow pore size distribution which ranged from 0.642 microns to about 0.09 microns with a mean pore size of 0.307 microns.

EXAMPLE 2

Porous Membranes Prepared From Pulverized Microlayered Blends By Compression Molding Microlayer coextruded blends containing 55% polyethylene (Dow HDPE 12065), 45% polystyrene (Dow PS 685D) and 7% additional styrene-butadiene-styrene rubber (Kraton ® 2701) were prepared by using the same method as that in Example 1. The twice coextruded blend was pelletized into small cylindrical pellets. 50 grams of the pellets were stored in a liquid nitrogen-filled Dewar for 5 minutes to rigidify the pellets. They were then ground into fine powders by using a Retsch Centrifugal Grinding Mill. About 86 weight percent of the coextruded blend particles passed through a Tyler #48 mesh screen, which has effective square openings of 0.0116 inch.

Two grams of the powders were spread uniformly between 2 pieces of Mylar films with precoated TFE mold release agents. The films with the powders were loaded between 2 pieces of metal plates. The whole assembly was then compression molded in a Pasadena hydraulic press. The molding conditions were 2 minute preheating at 300° F. under 500 pound load, 4 minute molding at 300° F. under 11,000 pound load, and 10 minute cooling at the same load by circulating the press with cool water. The Mylar films were stripped off the molded film. The molded film was about 2 to 4 mil thick and was translucent white. Sample films cut from the molded pieces were immersed in chloroform filled bottles. They were loaded on an Eberbach mechanical shaker for 16 hours to leach out the polystyrene. Samples were dried in a vacuum oven for 3 hours afterwards. They were seen to be white and opaque with fine pores on the surfaces as identified under SEM. The porosimetry as determined by using the Micromeritics Model 9305 mercury intrusion porosimeter showed that the membrane had a narrow pore size distribution which ranged from 0.502 micron to about 0.0702 micron with a mean pore size of 0.307 micron. The membrane had a sharp size cutoff as indicated by the mercury intrusion result.

The mean pore size and pore size distribution of the membrane was compared with that of Celgard ® and Millipore ® commercially available membranes, which were also determined by using the same mercury intrusion porosimetry method. The results are shown in the following table.

| Membrane | Grades | Rated Pore Size | Measurement Mean Pore Size | Cut-Off Range | Max. Pore Size Min. Pore Size |
|---|---|---|---|---|---|
| Celgard ® | 2402 | 0.02 μm | 0.0429 μm | 0.0125–0.115 μm | 9.2 |
| Millipore ® | PTFE FGLP | 0.2 μm | 0.502 μm | 0.055 ~ 3.59 μm | 65.3 |
| Millipore ® | Durapore HVLP | 0.45 μm | 0.642 μm | 0.188 ~ 2.19 μm | 11.7 |
| Membranes of Example 2 | — | — | 0.307 μm | 0.0702 ~ 0.502 μm | 7.2 |

EXAMPLE 3

Porous Membranes Prepared From Pulverized Microlayer Blends By Sintering

Pulverized microlayer blends containing 55% polyethylene (Dow HDPE 12065), 45% polystyrene (Dow PS 685D) and 7% additional styrene-butadiene-styrene rubber (Kraton ® 2701) were prepared by using the same method as that in Example 2. The following steps were used to prepare membranes from the powders.

1. Two grams of the powders were spread uniformly in a 2 inch diameter platen and were compacted under 500–1,000 psi pressure in a Loomis 60 ton Platen Press for 2 seconds. Particle size of the powders was the same as in Example 2.

2. Release the load and evacuate the sample chamber until reaching about 1–2 inches Hg vacuum. A pressure of 15,000 psi was applied to the platen for 10 seconds to compact the sample into a round disc of about 2 inches in diameter and 2 millimeters thick.

3. The disc was annealed in an oven at 130° C. for 15 minutes.

4. The disc was compacted again in a 250 ton Erie Press under 7,500 psi pressure at 130° C. for 2 seconds to sinter the sample disc into a uniform piece of film. It was then air cooled to room temperature. The thickness of the film was about 2 mil.

Samples cut from the sintered films were immersed in a chloroform filled bottle. It was loaded on the Eberbach mechanical shaker to leach out the polystyrene. Samples were dried in a vacuum oven afterwards. They were white, opaque and porous. The porosimetry as determined by the same equipment as that in Example 1 showed that the membrane had a narrow pore size distribution which ranged from 0.642 micron to about 0.09 micron with a mean pore size of about 0.35 micron.

The membrane had a sharp size cutoff as indicated by the mercury intrusion result.

effluent latexes was then calculated. The results are shown in the following table:

| | PS Latex 0.173 μm | | PS Latex 0.215 μm | | SB Latex 0.527 μm | | PS Latex 0.839 μm | |
|---|---|---|---|---|---|---|---|---|
| | Init. Conc. % | Perm. Conc. % | Init. Conc. % | Perm. Conc. % | Init. Conc. % | Perm. Conc. % | Init. Conc. % | Perm. Conc. % |
| Control Melt Blended 55% HDPE/45% PS/7% Kraton | 30 | 30 | 30 | 29.1 | 30.5 | 24.5 | 30 | 19.5 |
| Microlayered Blend from Example 3 | 30 | 27.7 | 30 | 28.6 | 30.5 | 1.8 | 30 | 0.94 |

Notes:
Init. Conc. = initial concentration of latexes.
Perm. Conc. = concentration of effluent latexes.

EXAMPLE 4

Porous Membranes Prepared From Conventional Melt Blends

As a control for the invented process, 55% polyethylene (Dow HDPE 12065), 45% polystyrene (Dow PS 685D) and 7% additional styrene-butadiene-styrene rubber (Kraton ® 1602) were melt blended together at 400° F. for 5 minutes in a Haake Brabender. Two grams of the blend were compression molded at 400° F. in a Pasadena hydraulic press into a piece of film of 2–3 mil thick. The molding conditions were 3 minute preheating, 6 minute molding and 10 minute water cooling. Samples cut from the molded film were immersed in a chloroform filled bottle. The bottle was loaded on an Eberbach mechanical shaker to leach out the polystyrene. Samples were dried in a vacuum oven for 3 hours. They were white, opaque and porous. The porosimetry as determined by using the same method as that in the previous examples showed that the membrane had a broad pore size distribution which ranged from 0.115 micron to about 12.3 microns with a mean pore size of about 2.2 to 2.8 microns. The membrane had a rough size cutoff as indicated by the mercury intrusion result.

EXAMPLE 5

Filtration Measurements

The flow property of polystyrene and styrene-butadiene latexes through the membranes was studied by using an Amicon Model 12, 10 mL stir cell. Latexes of different particle sizes and known concentrations were fed into the cell separately under a 10 psi pressure of nitrogen to determine the particle retention capability of the membranes. The effluent latex water solutions were collected and distilled carefully at 60° C. to determine the residue weights. The concentration of the The control sample was the melt blended 55% polyethylene (HDPE 12065), 45% polystyrene (Dow PS 685D), 7% styrene-butadiene-styrene rubber (Kraton ® 1602), which was the same as that used in Example 4. Samples were leached by chloroform for 16 hours and were dried in vacuum for 3 hours before the test. It is clear that membranes prepared from microlayered blends as described in Example 3 could successfully retain latex particles of 0.527 micron or smaller, while that from the melt blend could only hold fractions of them, indicating that the cutoff size of the control membrane was rough.

EXAMPLE 6

Water And Methanol Transmission Measurements (Note 1)

The transmission rate of water and methanol across the membranes was determined by using a 1 inch diameter Amicon Model 12, 10 mL filtration cell. Membranes prepared from Example 3 were loaded in the cell and supported on a stainless steel porous mat which has an effective diameter of 0.85 inch. The cell was applied with air pressure regulated by an Air-Pak filter-regulator. The effluent liquid from the cell was collected for rate measurements. Commercial Celgard ® 2402 microporous polypropylene membranes (2 ply form) were also evaluated as a comparison. The results are shown in the following table:

| Membrane | fluid | membrane thickness, mil | air pressure, psi | apparent flow rate, cc/min | transmission rate cc/in²-min |
|---|---|---|---|---|---|
| from Ex. 3 | methanol | 1.9 | 20 | 0.54 | 0.95 |
| | | | 40 | 0.94 | 1.66 |
| | water | 1.9 | 20 | 0.28 | 0.49 |
| | | | 40 | 0.57 | 1.00 |
| Celgard ® 2402 | methanol | 2.0 | 20 | 0.33 | 0.59 |
| | | | 40 | 0.69 | 1.22 |
| (2 ply) | water | 2.0 | 20 | 0.20 | 0.35 |
| | | | 40 | 0.42 | 0.74 |

The flow rate of methanol and water through the prepared membrane is apparently higher than that of the commercial Celgard ® 2402 on the same thickness basis.

The embodiments of the invention in which an exclusive property or privilege is claimed are defined as follows.

1. A process for preparing a microporous material comprising:

coextruding a plurality of interdigitated layers of at least a first polymeric material and a second different polymeric material to form a laminate product, such that said layers each have a thickness of from 0.03 to 5 microns, at least one of said polymeric materials having preferential solubility in a selected solvent with respect to the other of said polymeric materials;

pulverizing the resulting laminate product and recoextruding the pulverized product at least once to again form a layered material wherein each of said layers has a thickness of from about 0.03 to about 5 microns;

pulverizing said recoextruded material and forming a melt composition of the resulting pulverized granules into a thin, solid material;

contacting said solid material with an extraction medium which has a preferential solubility for at least one of said polymeric materials, whereby said preferentially soluble polymeric material is removed from said solid material to leave a porous material; and separating said extraction medium from said porous unitary material.

2. The process of claim 1 wherein said forming step comprises sintering, compression molding or the combination thereof.

3. The process of claim 2 wherein each of said layers in each step are formed to a thickness of from 0.03 to 1 micron.

4. A process according to claim 2 wherein said different polymeric materials comprise polyethylene and polystyrene.

5. A process according to claim 1 which includes providing a compatibilizing polymeric material interdigitated between each layer of said first and second polymeric materials of said laminate product.

6. A process according to claim 5 wherein said compatibilizing polymeric material comprises styrene-butadiene-styrene triblock copolymer.

7. A process according to claim 6 wherein said first polymeric material comprises polyethylene and said second polymeric material comprises polystyrene.

8. A process according to claim 1 wherein said preferentially soluble polymeric material is present in an amount of from 10 to 90 volume percent, based on the total volume of polymeric material.

9. A process according to claim 8 wherein said preferentially soluble polymeric material is present in an amount of from 30 to 85 volume percent.

10. A process according to claim 8 wherein said preferentially soluble polymeric material is present in an amount of from 50 to 80 volume percent.

11. The process of claim 8 wherein said forming step comprises sintering, compression molding or the combination thereof.

12. The method of claim 11 wherein each of said layers in each step are formed to a thickness of from 0.03 to 1 micron.

13. A process accordig to claim 12 wherein said different polymeric materials comprise polyethylene and polystyrene.

14. A process according to claim 13 which includes providing a compatibilizing polymeric material interdigitated between each layer of said first and second polymeric materials of said laminate product.

15. A process according to claim 14 wherein said compatibilizing polymeric material comprises styrene-butadiene-styrene triblock copolymer.

16. A process according to claim 11 wherein said first polymeric material comprises polyethylene and said second polymeric material comprises polystyrene.

17. The process of claim 1 wherein each said layer is a mixture of said first and second polymeric materials.

18. A process according to claim 17 which includes providing a compatibilizing polymeric material interdigitated between each layer of said first and second polymeric materials of said laminate product.

19. A process according to claim 18 wherein said compatibilizing polymeric material comprises said first polymeric material.

20. A process according to claim 18 wherein said compatibilizing polymeric material comprises said second polymeric material.

21. A process according to claim 18 wherein said first polymeric material comprises polyethylene, said second polymeric material comprises polystyrene and said compatibilizing polymeric material comprises polyethylene.

* * * * *